US012417629B2

(12) United States Patent
Falendysz et al.

(10) Patent No.: US 12,417,629 B2
(45) Date of Patent: Sep. 16, 2025

(54) ARCHITECTURE FOR DISTRIBUTED ARTIFICIAL INTELLIGENCE AUGMENTATION WITH OBJECTS DETECTED USING ARTIFICIAL INTELLIGENCE MODELS FROM DATA RECEIVED FROM MULTIPLE SOURCES

(71) Applicant: Tomahawk Robotics, Inc., Melbourne, FL (US)

(72) Inventors: Andrew D. Falendysz, Grant, FL (US); William S. Bowman, Melbourne, FL (US); Matthew D. Summer, Melbourne, FL (US); Daniel R. Hedman, Palm Bay, FL (US); Sean Wagoner, West Melbourne, FL (US)

(73) Assignee: Tomahawk Robotics, Inc., Melbourne, FL (US)

( * ) Notice: Subject to any disclaimer, the term of this patent is extended or adjusted under 35 U.S.C. 154(b) by 456 days.

(21) Appl. No.: 17/702,669

(22) Filed: Mar. 23, 2022

(65) Prior Publication Data
US 2023/0237802 A1 Jul. 27, 2023

Related U.S. Application Data

(60) Provisional application No. 63/302,224, filed on Jan. 24, 2022.

(51) Int. Cl.
*G06V 20/40* (2022.01)
*B64C 39/02* (2023.01)
(Continued)

(52) U.S. Cl.
CPC ............ *G06V 20/46* (2022.01); *B64C 39/024* (2013.01); *G06N 20/20* (2019.01); *G06V 10/70* (2022.01);
(Continued)

(58) Field of Classification Search
CPC ...... G06V 10/143; G06V 10/70; G06V 20/46; G06V 20/56; G06V 20/64; G06V 2201/07; G06N 20/20
(Continued)

(56) References Cited

U.S. PATENT DOCUMENTS 11,001,231 B1 5/2021 Hedman et al.
2016/0274589 A1* 9/2016 Templeton ............ G01S 17/86
(Continued)

FOREIGN PATENT DOCUMENTS

CN 114691019 A * 7/2022 ........... G06F 21/602
KR 20210134638 A 11/2021
WO 2012145822 A1 11/2012

OTHER PUBLICATIONS

Extended European Search Report issued in corresponding European Patent Application No. 22183837.8 on Jan. 11, 2023 (9 pages).

*Primary Examiner* — Chad Dickerson
(74) *Attorney, Agent, or Firm* — Perkins Coie LLP

(57) ABSTRACT

Methods and systems are described herein for generating composite data streams. A data stream processing system may receive multiple data streams from, for example, multiple unmanned vehicles and determine, based on the type of data within each data stream, a machine learning model for each data stream for processing the type of data. Each machine learning model may receive the frames of a corresponding data stream and output indications and locations of objects within those data streams. The data stream processing system may then generate a composite data stream with indications of the detected objects.

20 Claims, 7 Drawing Sheets

(51) Int. Cl.
*G06N 20/20* (2019.01)
*G06V 10/70* (2022.01)
*B64U 101/30* (2023.01)

(52) U.S. Cl.
CPC ...... *B64U 2101/30* (2023.01); *G06V 2201/07* (2022.01)

(58) Field of Classification Search
USPC .......................................................... 382/104
See application file for complete search history.

(56) References Cited

U.S. PATENT DOCUMENTS

| | | | |
|---|---|---|---|
| 2021/0063578 A1* | 3/2021 | Wekel | G01S 17/894 |
| 2021/0131821 A1* | 5/2021 | Wang | G01C 21/3889 |
| 2022/0161815 A1* | 5/2022 | Van Beek | B60W 40/09 |
| 2022/0374635 A1* | 11/2022 | Xiong | G08B 13/19608 |

* cited by examiner

200

203 206

| Data Type | Machine Learning Model Identifier |
|---|---|
| Video | Model_1 |
| Thermal | Model_2 |
| Infrared | Model_3 |

FIG. 2

| Frame | Detected Objects | Location |
|---|---|---|
| Stream1_Frame 1 | Object 1: Tank<br>Object 2: Missile System | Object 1: 255 X 375<br>Object 2: 1155 X 900 |
| Stream1_Frame 2 | Object 1: Tank<br>Object 2: Missile System | Object 1: 300 X 400<br>Object 2: 1155 X 900 |
| Stream2_Frame 1 | Object 1: Tank<br>Object 2: Missile System | Object 1: 600 X 700<br>Object 2: 155 X 1500 |

FIG. 4

ARCHITECTURE FOR DISTRIBUTED ARTIFICIAL INTELLIGENCE AUGMENTATION WITH OBJECTS DETECTED USING ARTIFICIAL INTELLIGENCE MODELS FROM DATA RECEIVED FROM MULTIPLE SOURCES

CROSS-REFERENCE TO RELATED APPLICATION

This application claims the benefit of priority of U.S. Provisional Application No. 63/302,224, filed Jan. 24, 2022. The content of the foregoing application is incorporated herein in its entirety by reference.

BACKGROUND

Stable and reliable robotic systems are becoming increasingly common, which has contributed to the recent advancement and proliferation of unmanned system technologies. In many instances these systems are equipped with recording devices (e.g., video, infrared, heat, audio, point cloud and/or other recording devices). Output data streams of these recording devices may enable an operator to get a good tactical view of what is happening on the ground. Furthermore, it may be useful for these output data streams to be annotated with different detected objects (e.g., tanks, operators, helicopters, etc.). One method of annotating these data streams may be achieved using machine learning models. These machine learning models are generally hosted on dedicated hardware with dedicated data sources, as they may require a large amount of processing resources (e.g., power, processor, memory, etc.). Thus, computing devices in the field may not be able to process data quickly and efficiently from multiple unmanned vehicles, especially if that data is of different types (e.g., video, infrared, audio, heat, etc.) requiring different machine learning models to process.

SUMMARY

Therefore, methods and systems are described herein for generating composite frames that include objects detected in multiple different types of data frames. For example, a data stream processing system may be used to perform the operations described herein. The data stream processing system may reside at a central location (e.g., a command-and-control point). For example, a command-and-control point may be in a vehicle equipped with one or more computing devices, a datacenter that houses computing devices or in another suitable environment. In some embodiments, the data stream processing system may receive multiple data streams from, for example, multiple unmanned vehicles and determine, based on the type of data within each data stream, a machine learning model for each data stream for processing that type of data. Each machine learning model may receive the frames of a corresponding data stream and output indications and locations of objects within those data streams. The data stream processing system may then generate a composite data stream with indications of the detected objects.

The data stream processing system may receive a plurality of data streams. The data streams may include recording data of a particular location and may include data of different types. In some embodiments, the data streams may be received from different unmanned vehicles. For example, an operator may control multiple unmanned vehicles using a controller device. Those unmanned vehicles may include one or more onboard recording devices (e.g., a video camera, a microphone, an infrared camera, a thermal imaging device, a LiDAR and/or another suitable recording device). Thus, in some embodiments, the plurality of data streams may include data streams having captured data of different wavelength ranges. The onboard recording devices may generate data streams and transmit those data streams to a central location (e.g., a data center or a command-and-control vehicle).

The data stream processing system may determine a type of data captured within each data stream. For example, the data stream processing system may determine that one data stream includes video data and/or audio data, another data stream include thermal data, and yet another data stream include infrared data. In some embodiments, the data stream processing system may make the determination based on the metadata associated with each stream. However, in some embodiments, the data stream processing system may determine, based on the different radio or light wavelength ranges for each data stream of the plurality of data streams, a type of data captured within each data stream.

The data stream processing system may identify machine learning models for detecting objects within the data streams. In particular, the data stream processing system may determine a plurality of machine learning models for the plurality of data streams based on the type of data captured within each data stream. Each machine learning model may have been trained to identify objects within a frame of a particular type of data. To continue with the example above, if one of the data streams includes video data, data stream processing system may identify a machine learning model trained for processing data streams including video data. If another data stream includes thermal imaging data, data stream processing system may identify a machine learning model trained for processing data streams including thermal imaging data.

The data stream processing system may use the identified machine learning models to process the received data streams. Thus, the data stream processing system may input each of the plurality of data streams into a corresponding machine learning model of the plurality of machine learning models. For example, each data stream may be divided into a plurality of frames. Thus, the data stream processing system may input each frame (e.g., sequentially or in parallel) into each machine learning model.

The data stream processing system may receive, from each machine learning model, a plurality of object identifiers and a plurality of object locations corresponding to one or more objects detected in each data stream of the plurality of data streams. For example, each machine learning model may detect objects within each frame of each data stream. Each machine learning model may output an identifier of the object and a location of the object within the frame. In some embodiments, each machine learning model may output a probability that the object has been detected. The object identifiers may include a description of the object (e.g., tank, operator, missile, etc.).

The data stream processing system may then group the frames of different data streams based on timestamps to add objects detected in different data streams to composite frames. Thus, the data stream processing system may select, from the plurality of data streams, a plurality of sets of frames. Each set of frames of the plurality of sets of frames may match a corresponding timestamp of a plurality of timestamps. For example, each data stream may include a plurality of frames with each frame having a timestamp (e.g., in metadata or stamped onto the frame). Thus, the data stream processing system may identify frames with matching timestamps and group them for composite data stream generation.

In some embodiments, the data stream processing system may synchronize the data streams when selecting the plurality of sets of frames from the plurality of data streams. The data stream processing system may determine a time period common to the plurality of data streams. For example, each data stream may have been recorded during the same time interval (e.g., between 16:25:00.000 and 17:25:00.000). In some embodiments, the recording time may be different for different time periods. Thus, data stream processing system may synchronize the overlapping frames.

The data stream processing system may then determine a frequency of each data stream of the plurality of data streams. For example, a video stream may have been recorded at 24 frames per second, a thermal imaging data stream may have been recorded at 120 frames per second, and a sound data stream may have been recorded at 44.1 thousand samples per second. In some embodiments, the data stream processing system may select a composite data stream frequency based on a lowest frequency data stream. For example, if the video stream has a frequency of 24 frames per second but other data streams have a higher frequency, the data stream processing system may select 24 frames per second as the composite frequency. Furthermore, to add sound to each frame, data stream processing system may use a different way to process audio streams. The data stream processing system may then select a first timestamp within the time period common to the plurality of data streams. For example, if the data streams have been synchronized as starting at 16:25:00.000, the data stream processing system may select 16:25:00.000 as the first timestamp.

The data stream processing system may then locate, within each data stream of the plurality of data streams, a corresponding frame associated with the first timestamp. In some embodiments, there may be more than one available frame for a particular timestamp. Thus, the data stream processing system may select a first frame in a chronological order, the last frame in chronological order, or another suitable frame. The data stream processing system may then generate a first set of frames that match the first timestamp based on frames with the plurality of data streams that match the first timestamp.

The data stream processing system may then generate a data stream of composite frames. Thus, the data stream processing system may generate a composite data stream based on the plurality of sets of frames. The composite data stream may include frames with indicators representing objects detected by each machine learning model at a corresponding location associated with each object.

In some embodiments, the data stream processing system may generate the composite data stream using a base frame and add the data from other frames (e.g., frames from other data streams) to the base frame. For example, the data stream processing system may retrieve, for a particular set of frames (e.g., a set of frames from different data streams, but for a particular timestamp), a plurality of objects detected by the plurality of machine learning models. The data stream processing system may then select a video frame from the first set of frames to be a base frame and determine for the plurality of objects corresponding locations within the video frame. The data stream processing system may then overlay an indicator of each corresponding object at the corresponding location within the video frame.

In some embodiments, multiple machine learning models may identify the same object at the same time. Thus, it may be possible that multiple indicators be displayed for each object. In some embodiments, each indicator may include information about the type of data stream in which the object was identified. In some embodiments, each indicator may be selectable. Thus, when a selection of the indicator is detected, the data stream processing system may generate for display the frame associated with the indicator. For example, if the base frame is a video frame and the object was also detected in a thermal imaging frame, the data stream processing system may generate for display the thermal frame when an indicator from the thermal frame is selected.

In some embodiments, only one indicator may be displayed; however, that indicator may indicate that the object has been detected in multiple streams. For example, the data stream processing system may determine that a first machine learning model detected a first object in a first frame of a first data stream and that a second machine learning model has detected the first object (the same object) in a second frame of a second data stream. Thus, the data stream processing system may add a first indicator to a first composite frame indicating that the first object has been detected by both the first machine learning model and the second machine learning model.

In some embodiments, the data stream processing system may generate for display the composite data stream. For example, the command-and-control location may include one or more display devices where the composite data stream may be displayed. In some embodiments, the data stream processing system may transmit the data stream to another location.

Various other aspects, features and advantages of the system will be apparent through the detailed description and the drawings attached hereto. It is also to be understood that both the foregoing general description and the following detailed description are examples and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion) a given item (e.g., data), unless the context clearly dictates otherwise.

BRIEF DESCRIPTION OF THE DRAWINGS

FIG. 2 illustrates an excerpt of a table that may store data types and corresponding machine learning models for processing those data types, in accordance with one or more embodiments of this disclosure.

FIG. 4 illustrates a data structure for storing detected objects and corresponding frame identifiers, in accordance with one or more embodiments of this disclosure.

DETAILED DESCRIPTION OF THE DRAWINGS

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
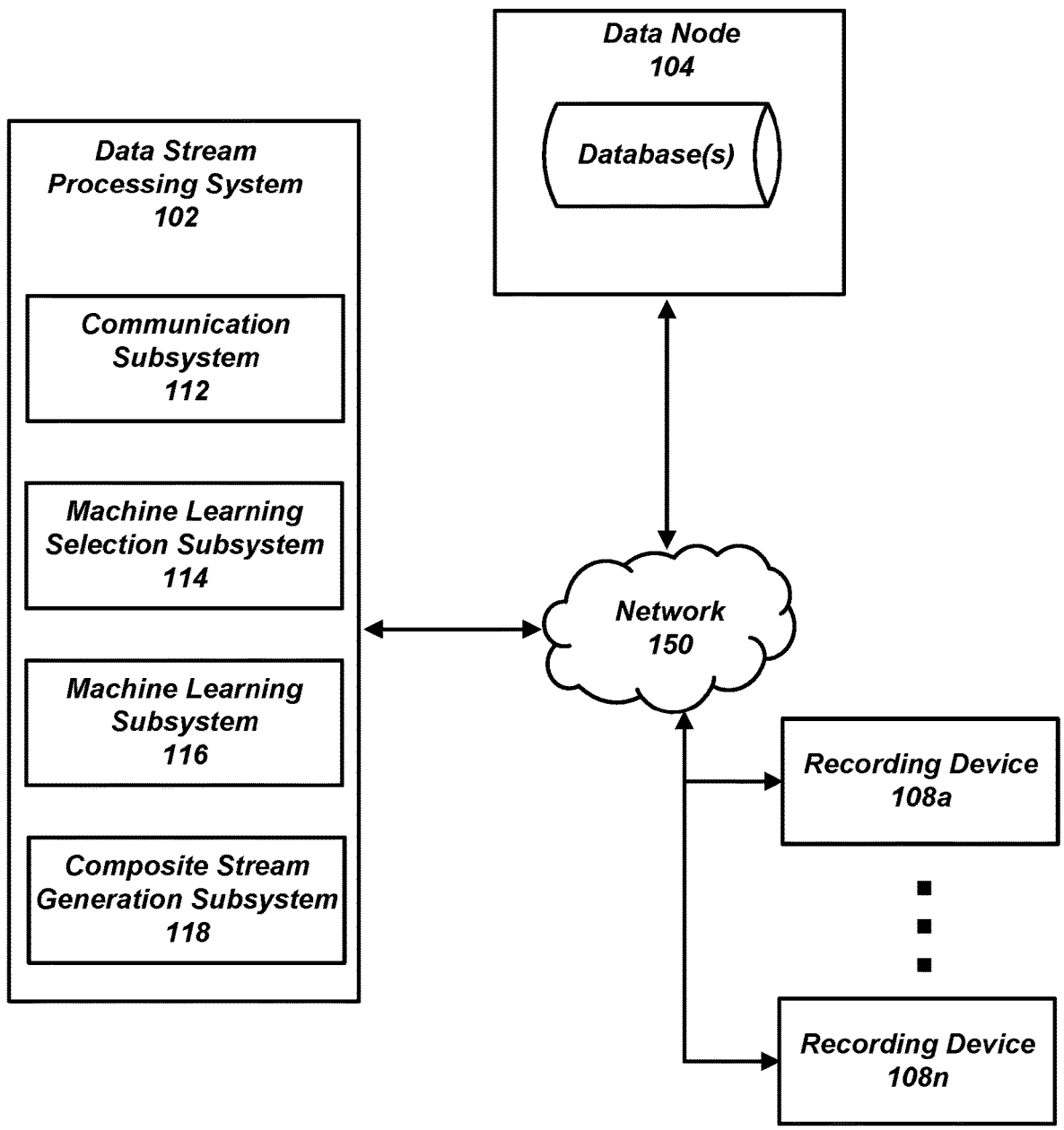
FIG. 1 shows an illustrative system for generating composite frames of objects detected in multiple different types of data streams, in accordance with one or more embodiments of this disclosure.

FIG. 1 is an example of environment 100 for generating composite images of objects detected in multiple different types of data frames. Environment 100 includes data stream processing system 102, data node 104, and recording devices 108a-108n. Data stream processing system 102 may execute instructions for generating composite images of objects detected in multiple different types of data frames. Data stream processing system 102 may include software, hardware or a combination of the two. In some embodiments, although shown separately, data stream processing system 102 and data node 104 may reside on the same computing device.

Data node 104 may store various data. For example, data node 104 may store a repository of machine learning models that may be accessed by data stream processing system. In some embodiments, data node 104 may also be used to train machine learning models and or adjust parameters (e.g., hyperparameters) associated with those machine learning models. Data node 104 may include software, hardware, or a combination of the two. For example, data node 104 may be a physical server, or a virtual server that is running on a physical computer system. In some embodiments, data node 104 may reside in a datacenter to be used by commanding officers for situational awareness. Network 150 may be a local area network, a wide area network (e.g., the Internet), or a combination of the two. Recording devices 108a-108n may be devices attached to unmanned vehicles and may include video cameras, infrared cameras, microphones, thermal imaging devices, and/or other suitable devices.

Data stream processing system 102 may receive a plurality of data streams that include recording data of a location. The plurality of data streams may include data streams having data of different types. For example, data stream processing system 102 may receive the data streams from different unmanned vehicles. Data stream processing system 102 may receive the data streams using communication subsystem 112. Communication subsystem 112 may include software components, hardware components, or a combination of both. For example, communication subsystem 112 may include a network card (e.g., a wireless network card/processor) that is coupled with software to drive the card/processor. The network card may be built into a server or another suitable computing device. The data streams may be received from one or more unmanned vehicles. For example, an unmanned vehicle (e.g., a drone) may include an onboard camera that may send images to communication subsystem 112 via a wireless connection. Another unmanned vehicle may include an onboard microphone and/or a thermal imaging device. Communication subsystem 112 may pass each stream or a pointer to each stream in memory, to machine learning selection subsystem 114.

In some embodiments, each data stream may include a corresponding plurality of frames. For example, a video data stream may include video frames, while a thermal imaging data stream may include thermal imaging frames. Thus, the plurality of data streams may include data streams having captured data of different wavelength ranges. For example, a data stream that includes infrared data may include data of a specific wavelength range (e.g., wavelength of infrared spectrum), while an audio data stream may include data of another wavelength range (e.g., sound spectrum). That data streams may be recording data of a particular location or of a particular range of locations. For example, if a mission is being executed against a particular target, a plurality of unmanned vehicles (e.g., having onboard different recording devices) may be used to record the area around the target. Thus, the location may be a target building, a target vehicle or another suitable target.

Machine learning selection subsystem 114 may include software components, hardware components, or a combination of both and may be used to determine a corresponding machine learning model to use for each data stream. Thus, machine learning selection subsystem 114 may determining a type of data captured within each data stream. For example, each data stream may include accompanying metadata that may indicate a type of data is included in the stream. Thus, machine learning selection subsystem 114 may access the metadata of each stream and determine the type of data within that stream.

In some embodiments, machine learning selection subsystem 114 may use the wavelength of data within the data stream to determine the type of data within that data stream. For example, machine learning selection subsystem 114 may sample a portion (e.g., a frame) of a data stream and determine the wavelength of the data within the data stream. Machine learning selection subsystem 114 may sample a particular data stream and determine that the wavelength of data within that data stream is between 780 nm and 1 mm. Based on that wavelength, machine learning selection subsystem 114 may determine that the data stream include data captured by an infrared camera (e.g., the data type is infrared).

Based on the type of data within each data stream, the machine learning selection subsystem may identify a machine learning model to process that data stream. Thus, machine learning selection subsystem 114 may determine, for the plurality of data streams based on the type of data captured within each data stream, a plurality of machine learning models for processing the data within those data streams. Each machine learning model may have been trained to identify objects within a frame of a particular type of data. For example, a particular machine learning model may have been trained to identify objects within a particular data stream. A particular machine learning model may have been trained to identify objects within thermal imaging data (e.g., thermal data frames), while another machine learning model may have been trained to identify objects within video data, and yet another machine learning model may have been trained to identify objects within infrared data streams.

FIG. 2 illustrates an excerpt of a table 200 that may store data types and corresponding machine learning models for processing those data types. Column 203 may store types of data while column 206 may store machine learning model identifiers for the corresponding data types. Thus, machine learning selection subsystem 114 may, after determining a type of data associated with a particular stream, iterate through data types in column 203 of table 200 to locate a matching data type. When machine learning selection subsystem 114 locates the matching data type, machine learning selection subsystem 114 may retrieve a corresponding machine learning model identifier. Machine learning selection subsystem 114 may repeat this process for each received data stream. In some embodiments, a first type of data stream may be video data, a second type of data may be infrared data, a third type of data may be thermal data, a fourth type of data may be audio data, and a fifth type of data may be point cloud data. Machine learning selection subsystem 114 may pass indicators of the streams and corresponding identified machine learning models to machine learning subsystem 116.

Machine learning subsystem 116 may include software components, hardware components, or a combination of both. For example, machine learning subsystem 116 may include software components that access data in memory and/or storage and may use one or more processors to perform its operations. Machine learning subsystem 116 may receive the indicators of the streams and the corresponding machine learning models and use the machine learning models to identify objects within those data streams. In particular, machine learning subsystem 116 may input each of the plurality of data streams into a corresponding machine learning model of the plurality of machine learning models. For example, machine learning subsystem 116 may use the identifiers associated with the identified machine learning models to access (e.g., using an application programming interface) those machine learning models and input the data streams into those machine learning models.

In some embodiments, each data stream may be a digital file. The digital file may be input into to the corresponding machine learning model (e.g., a machine learning model hosted by data stream processing system 102 or hosted on data node 104). Each machine learning model may break the digital file into frames and process each frame to identify objects in each frame. A frame may be in image or another suitable portion of the data stream. In some embodiments, each machine learning model may be trained to identify objects in frames (e.g., video images, thermal images, etc.). Thus, machine learning subsystem 116 may split the data stream (e.g., the digital file) into portions (e.g., frames, images, etc.) that will enable each machine learning model to process the frames and identify objects in those frames.

Figure 3:
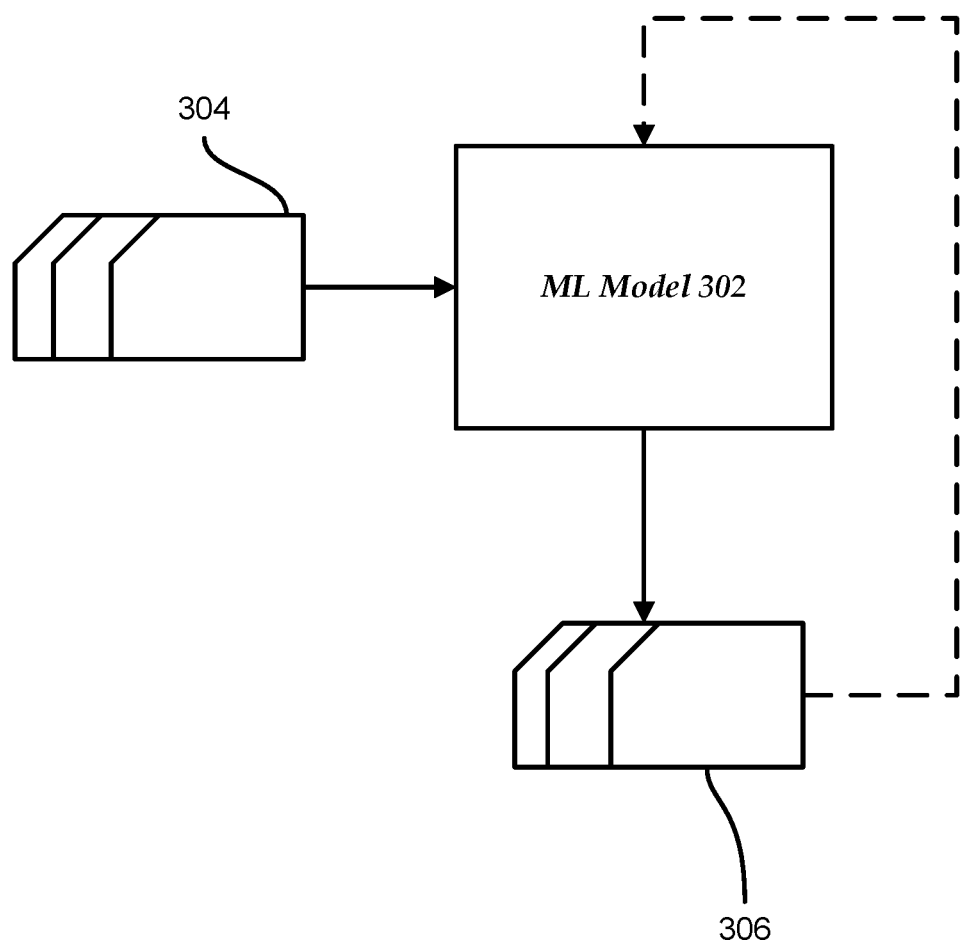
FIG. 3 illustrates an exemplary machine learning model, in accordance with one or more embodiments of this disclosure.

The machine learning models and algorithms described above may take many forms. However, these machine learning models and/or algorithms may be used by machine learning subsystem 116 with any application programming interface. FIG. 3 illustrates an exemplary machine learning model. Machine learning model 302 may take input 304 (e.g., frame data, image data, sound data, point cloud data, etc.) and may output 306 coordinates (e.g., coordinates within a frame) and object identifiers of objects detected within a frame. In some embodiments, each machine learning model may output a probability that the object has been detected. The output parameters may be fed back to the machine learning model as input to train the machine learning model (e.g., alone or in conjunction with user indications of the accuracy of outputs, labels associated with the inputs, or other reference feedback information). The machine learning model may update its configurations (e.g., weights, biases, or other parameters) based on the assessment of its prediction (e.g., of an information source) and reference feedback information (e.g., user indication of accuracy, reference labels, or other information). Connection weights may be adjusted, for example, if the machine learning model is a neural network, to reconcile differences between the neural network's prediction and the reference feedback. One or more neurons of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model may be trained to generate better predictions of information sources that are responsive to a query.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function, which combines the values of all of its inputs together. Each connection (or the neural unit itself) may have a threshold function that a signal must surpass before it propagates to other neural units. The machine learning model may be self-learning and/or trained, rather than explicitly programmed, and may perform significantly better in certain areas of problem solving, as compared to computer programs that do not use machine learning. During training, an output layer of the machine learning model may correspond to a classification of machine learning model, and an input known to correspond to that classification may be input into an input layer of the machine learning model during training. During testing, an input without a known classification may be input into the input layer, and a determined classification may be output.

A machine learning model may include embedding layers in which each feature of a vector is converted into a dense vector representation. These dense vector representations for each feature may be pooled at one or more subsequent layers to convert the set of embedding vectors into a single vector.

The machine learning model may be structured as a factorization machine model. The machine learning model may be a non-linear model and/or supervised learning model that can perform classification and/or regression. For example, the machine learning model may be a general-purpose supervised learning algorithm that the system uses for both classification and regression tasks. Alternatively, the machine learning model may include a Bayesian model configured to perform variational inference on the graph and/or vector.

When each machine learning model is finished processing a corresponding data stream, the resulting data is output from each machine learning model. Thus, machine learning subsystem 116 may receive, from each machine learning model, a plurality of object identifiers and a plurality of object locations corresponding to one or more objects detected in each data stream of the plurality of data streams. In some embodiments, each machine learning model may also output a probability that a particular object was detected in a particular frame. For sound data streams, the machine learning model may output the location of a particular sound and/or a direction if the sound being detected is located outside a particular area (e.g., outside of an area that is being recorded by other recording devices (e.g., video cameras, thermal imaging device, infrared cameras, etc.)).

In some embodiments, model output may be stored in a data structure and linked to an identifier of a frame where that object was detected. For example, as each frame is processed by each machine learning model, machine learning subsystem 116 may receive machine learning model output for that frame. Thus, machine learning subsystem 116 may generate a portion of a data structure for each frame. In some embodiments, the data structure may be a table. FIG. 4 illustrates an excerpt of a table 400 storing object indicators, locations of those indicators, and corresponding frame identifiers. Column 403 stores frame identifiers. Each frame identifier may identify a frame and a data stream that the frame was extracted from. In some embodiments, column 403 may store a timestamp associated with the frame (e.g., the time and/or date that the information in the frame was recorded). Column 406 stores indications of the objects detected within a corresponding frame. Column 406 may include an object name and/or an object description. In some embodiments, column 406 may include a link to an object description. Column 409 may include a location of the object within the frame. In some embodiments, the location may be a single point associated with the object. However, in some embodiments, the location may be multiple points associated with the object.

Based on output of each machine learning model as each machine learning model processes frames of the data streams, machine learning subsystem 116 may add information to table 400. That is, machine learning subsystem 116 may be building table 400 as the machine learning models output information associated with identified objects. In some embodiments, machine learning subsystem 116 may calculate the location of each detected object within three-dimensional space. For example, if the frame is a video frame, machine learning subsystem 116 may determine the latitude and longitude of each object. This determination may be made using the location of the unmanned vehicle that recorded the video frame together with the heading of the vehicle and direction of the recording device.

Machine learning subsystem 116 may indicate to composite stream generation subsystem 118 that machine learning model output is ready for generation of a composite stream. Composite stream generation subsystem 118 may include software components, hardware components, or a combination of both. For example, composite stream generation subsystem 118 may include software components that access data in memory and/or storage and may use one or more processors to perform its operations. Composite stream generation subsystem may use the detected objects and the data streams to generate composite frames and assemble those frames into a composite data stream.

Figure 5:
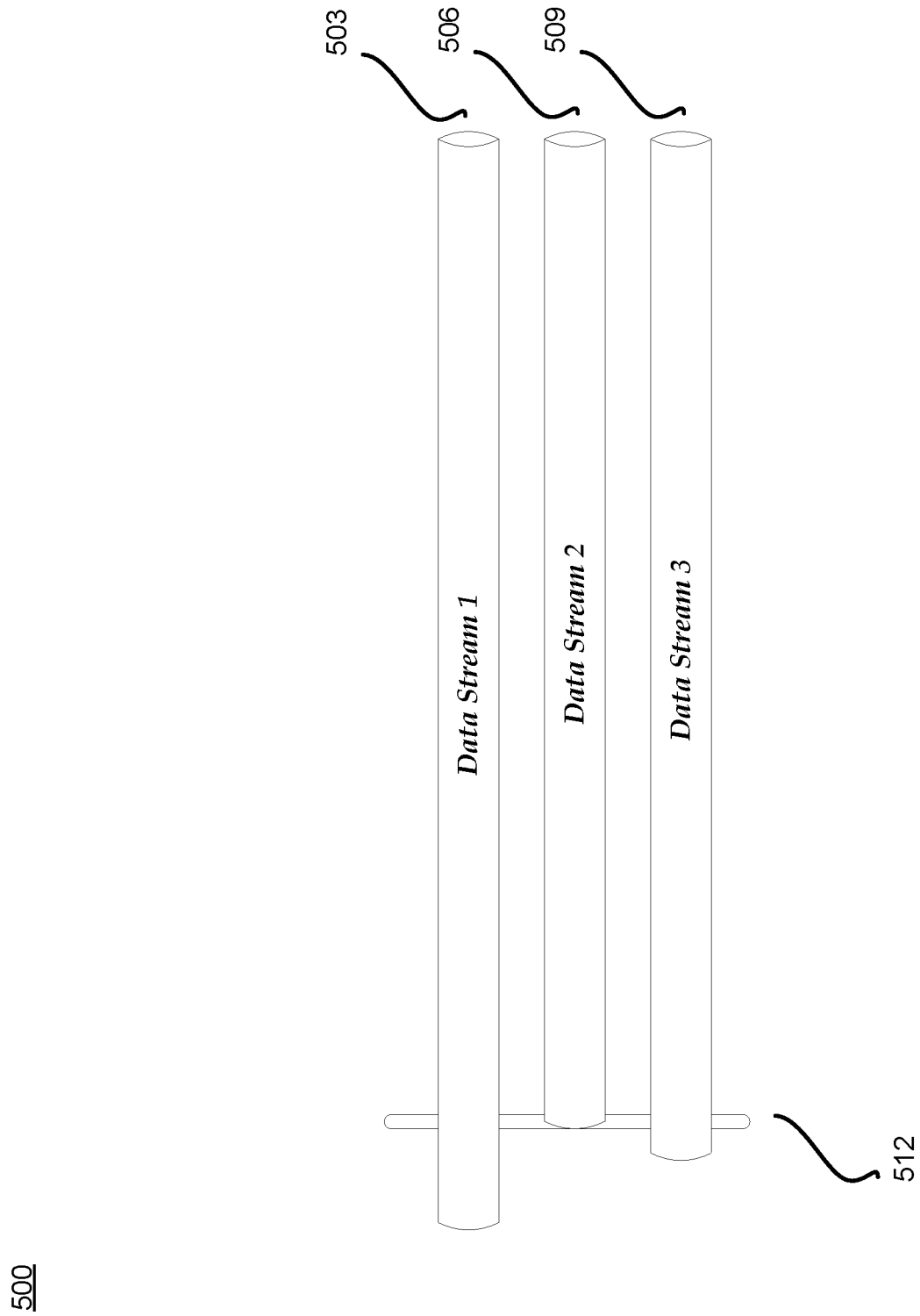
FIG. 5 illustrates frame selection for a particular composite frame, in accordance with one or more embodiments of this disclosure.

Composite stream generation subsystem 118 may select, from the plurality of data streams, a plurality of sets of frames. Each set of frames of the plurality of sets of frames matches a corresponding timestamp of a plurality of timestamps. For example, each data stream may include a corresponding plurality of frames. Each of those frames may be associated with a particular timestamp (e.g., a time of when that frame was captured). In some embodiments, composite stream generation subsystem 118 may iterate through each received data stream and determine a timestamp of an earliest frame recorded in each of those data streams. Composite stream generation subsystem 118 may then select the latest timestamp of the earliest frames and use that timestamp as the first timestamp for composite frame generation. FIG. 5 illustrates frame selection for a first composite frame. Illustration 500 of FIG. 5 shows three data streams (data stream 503, data stream 506, and data stream 509). Each data stream may include a plurality of frames (e.g., video frames, thermal imaging frames, infrared frames, etc.). Thus, composite stream generating subsystem 118 may determine for each of data stream 503, data stream 506, and data stream 509 a starting timestamp. FIG. 5 illustrates that the starting timestamp for data stream 506 is the latest timestamp. Thus, indicator 512 illustrates the frames that will be selected for a starting composite frame. Composite stream generation subsystem 118 may iterate through each timestamp and generate a plurality of sets of frames.

In some embodiments, the received data streams may have different associated frequencies. For example, video data streams may have a frequency of 24 frames per second, while a thermal imaging data streams may have a frequency of 120 frames per second. Thus, composite stream generating subsystem 118 may adjust for different frequencies of different data streams by sub sampling or interpolating some data streams for generating composite frames. The system may choose to generate output at a rate equal to the lowest input data update rate, and subsample or average data in the higher-rate streams. Alternatively, the system may choose to output at a rate higher than the lowest input update rate using interpolation or other means of up-sampling data. In particular, composite stream generating subsystem 118 may determine a time period common to the plurality of data streams. For example, composite stream generating subsystem 118 may retrieve a starting timestamp associated with a starting frame of each data stream and an ending timestamp associated with an ending frame of each data stream. In some embodiments, composite stream generating subsystem 118 may retrieve the starting timestamp and the ending timestamp from metadata associated with each data stream.

Composite stream generation subsystem 118 may determine a frequency of each data stream of the plurality of data streams. For example, composite stream generating subsystem 118 may determine how many frames are recorded per second for each data stream by, for example, retrieving timestamps for a plurality of frames and dividing a time range of the timestamps by the number of frames. In some embodiments, composite stream generation subsystem 118 may retrieve the frequency of each data stream from metadata received form the corresponding data stream. Composite stream generation subsystem 118 may select a composite data stream frequency based on a lowest frequency data stream. For example, composite stream generation subsystem 118 may select, as the base frequency, the lowest frequency. That is, if data stream 503 has a frequency of 120 frames per second, data stream 506 has a frequency of 60 frames per second, and data stream 509 has a frequency of 24 frames per second, composite stream generation subsystem 118 may select 24 frames per second as the frequency. In some embodiments, composite stream generation subsystem 118 may select the highest frequency data stream.

Composite stream generation subsystem 118 may then select a first timestamp within the time period common to the plurality of data streams. For example, as illustrated in FIG. 5, different data streams may have different start times. Thus, composite stream generation subsystem 118 may select a start time common to all received data streams. In some embodiments, composite stream generation subsystem 118 may select, as a start timestamp, the earliest timestamp within any of the received data streams.

Composite stream generation subsystem 118 may then locate, within each data stream of the plurality of data streams, a corresponding frame associated with the first timestamp. Thus, composite stream generation subsystem 118 may iterate through each data stream until the frame with the first timestamp is located. Composite stream generation subsystem 118 may then generate a first set of frames that match the first timestamp based on frames with the plurality of data streams that match or are suitably close to the first timestamp (e.g., within ⅛th, ¹/₁₆th, ¹/₃₂nd of second). The first set of frames may include frames from different data streams having matching timestamps. For two timestamps to match, those timestamps do not necessarily need to be identical. Two timestamps may match when they are within a particular threshold of each other (e.g., within ¹/₁₀₀₀th of a second, ¹/₁₀₀th of a second, or within another suitable threshold).

Composite stream generation subsystem 118 may generate a composite data stream based on the plurality of sets of frames. The composite data stream may include frames with indicators representing objects detected by each machine learning model at a corresponding location associated with each object. In some embodiments, composite stream generation subsystem 118 may select a base frame based on the frequency and then add indicators of objects (e.g., using overlays) detected in other received data streams into the selected frame. For example, there may be three received data streams. A first data stream may be a video data stream with a frequency of 24 frames per second. A second data stream may be an infrared data stream with a frequency of 60 frames per second. A third data stream may be a thermal data stream with a frequency of 120 frames per second. Composite stream generation subsystem 118 may select the video data stream (e.g., having the lowest frames per second) as a base data stream (i.e., use the frames of that data stream as base frames). Thus, for the other two received data streams, the frames beyond 24 frames per second will not be included in the composite data stream. Accordingly, some data may be lost.

In some embodiments, composite stream generation subsystem 118 may always select video data stream frames as base frames, for example, because people are used to looking at video frames versus, for example, thermal imaging frames. Thus, composite stream generation subsystem 118 may retrieve (e.g., from memory or from data node 104), for a first set of frames, a plurality of objects detected by the plurality of machine learning models. In some embodiments, the first set of frames may be a data structure with pointers to the selected frames. In some embodiments, the pointers may be to frames stored in a data structure together with identified objects (e.g., as illustrated in FIG. 4).

Composite stream generation subsystem 118 may then determine the types of frames within the first set of frames and select a video frame from the first set of frames as a base frame. Composite stream generation subsystem 118 may then determine, for the plurality of objects, corresponding locations within the video frame. For example, composite stream generation subsystem 118 may access table 400 (as illustrated in FIG. 4) and retrieve the object types and/or object descriptions together with object locations. Composite stream generation subsystem 118 may then overlay an indicator of each corresponding object at the corresponding location within the video frame. For example, an indicator may be some text and/or graphics (e.g., an icon) indicating each object.

In some embodiments, composite stream generation subsystem 118, may overlay indicators of objects detected by other machine learning models (e.g., from other data streams) onto the base frame. Thus, composite stream generation subsystem 118 may retrieve object identifiers and locations of objects associated with other frames of the first set of frames (i.e., from frames of different data streams with matching timestamps). Composite stream generation subsystem 118 may then add indicators of those objects to the base data frame.

In some embodiments, prior to adding those indicators, composite stream generation subsystem may determine whether some of the detected objects are the same as the object detected in the base data frame and may also convert the location of the object within the data frame where the object was detected to a location within the base data frame. Thus, composite stream generation subsystem 118 may determine that a first machine learning model and a second machine learning model have both detected the same object in a frame of a first data stream and in a frame of a second data stream, respectively. To perform this determination, composite stream generation subsystem 118 may compare a type of object detected (e.g., a tank, a missile system, a drone, a helicopter, etc.). Furthermore, composite stream generation subsystem 118 may calculate and compare coordinates in a three-dimensional space (e.g., latitude and longitude) of the object detected within the first frame (i.e., by the first machine learning model) and coordinates in a three-dimensional space of the object(s) detected within the second frame (i.e., by the second machine learning model). If the coordinates and/or the object type matches, composite stream generation subsystem 118 may determine that the same object was detected in both data streams.

When composite stream generation subsystem 118 determines that the two detected objects are the same object, composite stream generation subsystem 118 may add a first indicator to a first composite frame indicating that the first object has been detected by both the first machine learning model and the second machine learning model. For example, the indicator may include an indication of the types/names of streams that the object was detected in.

In some embodiments, composite stream generation subsystem 118 may determine that the machine learning model associated with the base frame having a particular timestamp did not detect a particular object, but another machine learning model detected that object in a frame having the same particular timestamp but being from a different data stream. In these instances, composite stream generation subsystem 118 may overlay an indicator of the object detected in another frame onto the base frame. In some embodiments, the indicator of the object may be an image of the object itself overlayed at the coordinates of the object. For example, a first data stream may be a video data stream and a second data stream may be a thermal imaging data stream. A particular object may not be detected in a video data stream. However, that object may be detected in a thermal imaging data stream. Thus, composite stream generation subsystem 118 may overlay that object onto the base frame (e.g., the video frame) in the location on the base frame corresponding to the location of the object in three-dimensional space.

Thus, composite stream generation subsystem 118 may determine that a first machine learning model did not detect a first object in a first frame of a first data stream and that a second machine learning model has detected the first object in a second frame of a second data stream. That is, the first frame and the second frame may be part of the same set of frames (i.e., both frames having a matching timestamp). Composite stream generation subsystem 118 may determine, based on a first location associated with the first object in the second frame, a second location of the first object in the second frame. That is, the first location and the second location have matching geographic coordinates. For example, each data stream may have associated meta data describing the position (e.g., position of the camera), direction of the recording and recording settings of the recording device. Based on that information, composite stream generation subsystem 118 may determine three-dimensional coordinates of each frame and then determine the position of any particular object within the three-dimensional space. Based on those positions, composite stream generation subsystem 118 may translate a position with the first frame to a position within the second frame. Thus, composite stream generation subsystem 118 may generate a composite frame from the first frame and, in some embodiments, generate an indicator of the object on the base frame at the location of the object. In some embodiments, composite stream generation subsystem 118 may overlay an image of the first object onto the composite frame at the second location. For example, composite stream generation subsystem 118 may identify coordinates of the object within a thermal imaging frame corresponding to an object (e.g., a person) and extract a portion of the image from that frame. Composite stream generation subsystem 118 may then add the extracted image onto the base frame at the appropriate location (e.g., the translated location).

In some embodiments, composite stream generation subsystem 118 may identify clusters of objects (e.g., two or more objects in the same location) that may trigger an alert. For example, one machine learning model may detect a person and another machine learning model may detect a weapon in the same location. Based on these two objects being within the same location, composite stream generation subsystem 118 may generate an alert. The alert may be displayed within the composite frame in the vicinity of the objects. For example, composite stream generation subsystem 118 may generate for display a red icon and/or a red box around the cluster of objects.

Thus, in some embodiments, composite stream generation subsystem 118 may determine that a first location in three-dimensional space of a first object detected by a first machine learning model of the plurality of machine learning models matches a second location within the three-dimensional space of a second object detected by a second machine learning model of the plurality of machine learning models. To perform this operation, composite stream generation subsystem 118 may calculate a three-dimensional location of each object from the data received from each machine learning model. Composite stream generation subsystem 118 may store the location in a data structure associated with a corresponding object.

Composite stream generation subsystem 118 may determine that the first object is associated with a first type and the second object is associated with a second type. For example, composite stream generation subsystem 118 may determine, based on object identifier of each object, a corresponding object type. In some embodiments, the object type may be stored in the data structure corresponding to the object. Composite stream generation subsystem 118 may then determine, based on type data, that a combination the first type and the second type indicates an alert condition. For example, composite stream generation subsystem 118 may access a database storing identifiers of object clusters (e.g., combinations of object types) that have been added to the system for generating alerts. Composite stream generation subsystem 118 may compare the object types associated with the first object and the second object with the data stored in the database (e.g., combinations of types). Based on determining that the combination of the first type and the second type matches a combination in the database, composite stream generation subsystem 118 may determine that an alert should be generated. In addition, composite stream generation subsystem 118 may extract (e.g., from the database) alert information associated with a particular cluster (e.g., combination of object types). For example, the database may store alert text data and/or alert image data to be displayed with the alert.

Based on determining that the combination the first type and the second type indicates the alert condition, composite stream generation subsystem 118 may generate for display, with the composite data stream, an alert associated with the first location. For example, composite stream generation subsystem 118 may retrieve alert text and/or alert image data from the database and cause that data to be displayed in the vicinity of the detected cluster of objects.

In some embodiments, an operator of the unmanned vehicles may generate a command for those vehicles to take up positions or adjust positions (e.g., during a mission) based on a type of recording device onboard each vehicle. For example, if a drone includes a thermal imaging camera, it may be useful for that drone to be hovering above a target location so that operators are able to see people in the image. If a land vehicle includes a video camera, it may be useful to position that vehicle in the front of an extraction team so that it is easier to see where the team is going.

Thus, composite stream generation subsystem 118 may transmit a payload request to each unmanned vehicle of the plurality of unmanned vehicles. Each payload request may query the corresponding unmanned vehicle for an identifier of recording device onboard. For example, each payload request may ask to return a device type. Composite stream generation subsystem 118 may receive, from the plurality of unmanned vehicles, a plurality of identifiers of recording devices onboard each unmanned vehicle. For example, composite stream generation subsystem 118 may receive types such as video camera, thermal imaging camera, infra-red camera, long range microphone and/or other suitable responses. Composite stream generation subsystem 118 may generate, for each unmanned vehicle in the plurality of unmanned vehicles based on a corresponding recording device, a movement command for moving a corresponding vehicle into a position for receiving data of the location. For example, using a target location, composite stream generation subsystem 118 may instruct a drone with a thermal imaging camera to move above the target location and record the target location.

Computing Environment

Figure 6:
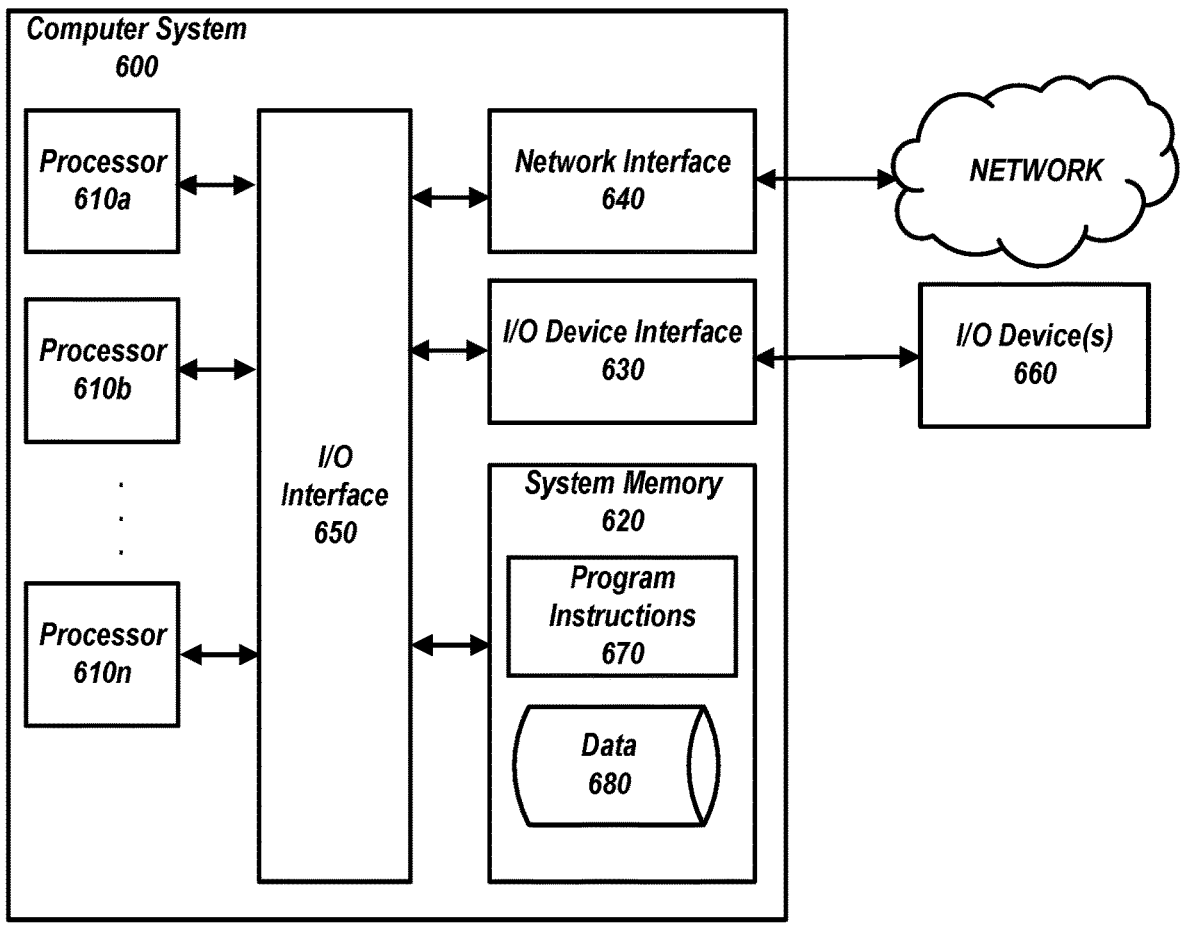
FIG. 6 illustrates a computing device, in accordance with one or more embodiments of this disclosure.

FIG. 6 shows an example computing system that may be used in accordance with some embodiments of this disclosure. In some instances, computing system 600 is referred to as a computer system. The computing system may be hosted on an unmanned vehicle, a controller or another suitable device. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer system(s) similar to computing system 600. Further, processes and modules described herein may be executed by one or more processing systems similar to that of computing system 600.

Computing system 600 may include one or more processors (e.g., processors 610a-610n) coupled to system memory 620, an input/output (I/O) device interface 630, and a network interface 640 via an I/O interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610a), or a multi-processor system including any number of suitable processors (e.g., 610a-610n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry (e.g., an FPGA (field-programmable gate array) or an ASIC (application-specific integrated circuit)). Computing system 600 may include a plurality of computing devices (e.g., distributed computer systems) to implement various processing functions.

I/O device interface 630 may provide an interface for connection of one or more I/O devices 660 to computer system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computer system 600 through a wired or wireless connection. I/O devices 660 may be connected to computer system 600 from a remote location. I/O devices 660 located on remote computer systems, for example, may be connected to computer system 600 via a network and network interface 640.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610a-610n) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 620 may include a tangible program carrier having program instructions stored thereon. A tangible program carrier may include a non-transitory, computer readable storage medium. A non-transitory, computer readable storage medium may include a machine-readable storage device, a machine-readable storage substrate, a memory device, or any combination thereof. Non-transitory, computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 620 may include a non-transitory, computer readable storage medium that may have program instructions stored thereon that are executable by a computer processor (e.g., one or more of processors 610a-610n) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610a-610n, system memory 620, network interface 640, I/O devices 660, and/or other peripheral devices. I/O interface 650 may perform protocol, timing or other data transformations to convert data signals from one component (e.g., system memory 620) into a format suitable for use by another component (e.g., processors 610a-610n). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600, or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative and is not intended to limit the scope of the techniques described herein. Computer system 600 may include any combination of devices or software that may perform or otherwise provide for the performance of the techniques described herein. For example, computer system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS) or the like. Computer system 600 may also be connected to other devices that are not illustrated or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Operation Flow

Figure 7:
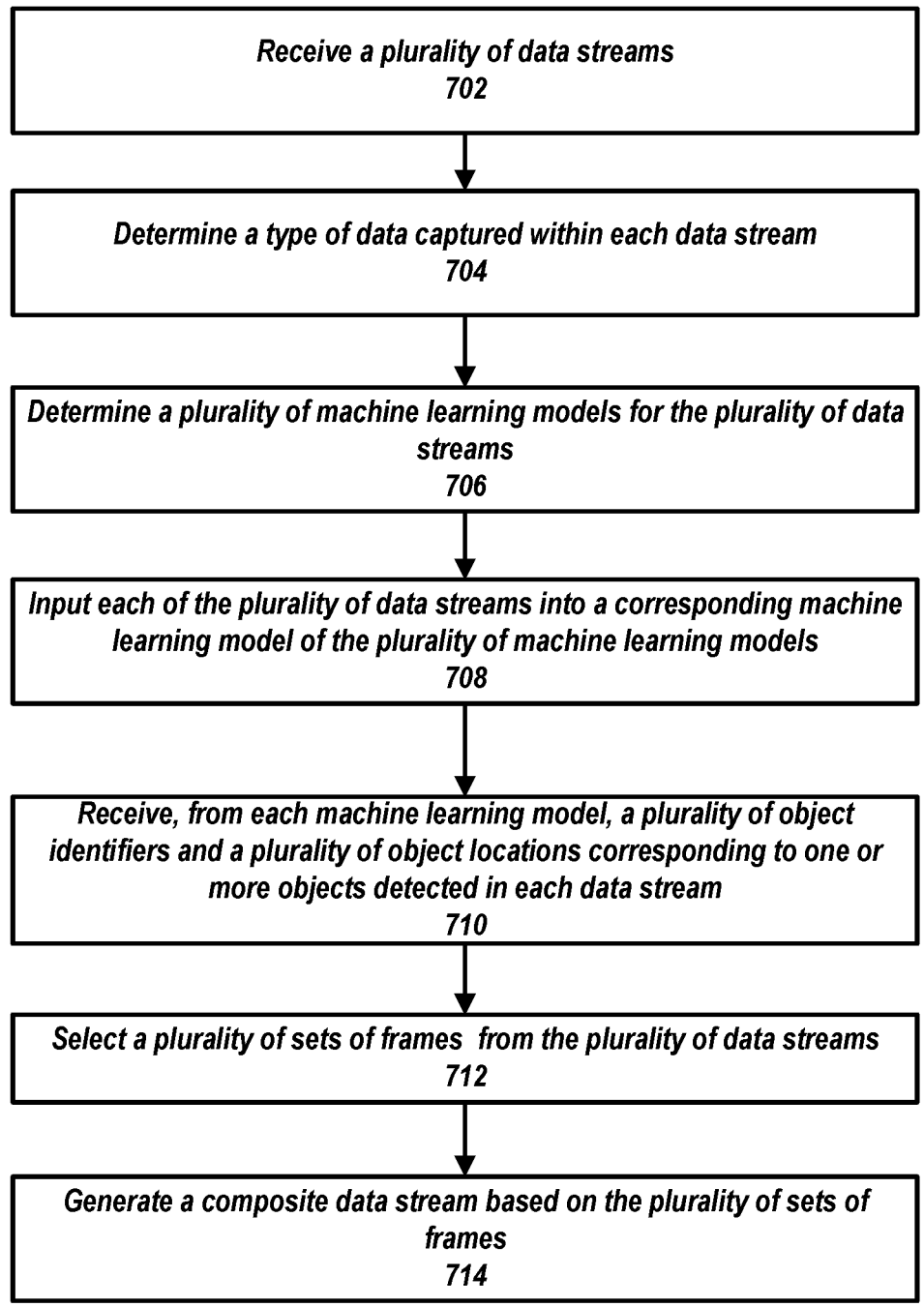
FIG. 7 is a flowchart of operations for generating composite frames of objects detected in multiple different types of data streams, in accordance with one or more embodiments of this disclosure.

FIG. 7 is a flowchart 700 of operations for generating composite frames of objects detected in multiple different types of data streams. The operations of FIG. 7 may use components described in relation to FIG. 6. In some embodiments, data stream processing system 102 may include one or more components of computing system 600. At 702, data stream processing system 102 receives a plurality of data streams. For example, the data stream processing system may receive the frames from any recording devices 108a-108n, for example, mounted on unmanned vehicles. Data stream processing system 102 may receive the frames over network 150 using network interface 640. In some embodiments, data stream processing system 102 may receive the data streams from data node 104.

At 704, data stream processing system 102 determines a type of data captured within each data stream. For example, data stream processing system 102 may use one or more processors 610a, 610b and/or 610n to perform the determination. At 706, data stream processing system 102 determines a plurality of machine learning models for the plurality of data streams. For example, data stream processing system 102 may use one or more processors 610a-610n to perform the determination.

At 708, data stream processing system 102 inputs each of the plurality of data streams into a corresponding machine learning model of the plurality of machine learning models. Data stream processing system 102 may perform this operation using one or more processors 610a, 610b and/or 610n and one or more application programming interfaces. At 710, data stream processing system 102 receives, from each machine learning model, a plurality of object identifiers and a plurality of object locations corresponding to one or more objects detected in each data stream. Data stream processing system 102 may use one or more processors 610a, 610b and/or 610n and/or system memory 620 to perform this operation.

At 712, data stream processing system 102 selects a plurality of sets of frames from the plurality of data streams. Data stream processing system 102 may perform this operation using one or more processors 610a, 610b and/or 610n. At 714, data stream processing system 102 generates a composite data stream based on the plurality of sets of frames. Data stream processing system 102 may use one or more processors 610a, 610b and/or 610n and/or system memory 620 to perform this operation.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: receiving a plurality of data streams comprising recording data of a location, wherein the plurality of data streams comprises data of different types; determining a type of data captured within each data stream; determining, for the plurality of data streams based on the type of data captured within each data stream, a plurality of machine learning models, wherein each machine learning model of the plurality of machine learning models has been trained to identify objects within a frame of a particular type of data; inputting each of the plurality of data streams into a corresponding machine learning model of the plurality of machine learning models.

Receiving, from each machine learning model, a plurality of object identifiers and a plurality of object locations corresponding to one or more objects detected in each data stream of the plurality of data streams; selecting, from the plurality of data streams, a plurality of sets of frames, wherein each set of frames of the plurality of sets of frames matches a corresponding timestamp of a plurality of timestamps; and generating a composite data stream based on the plurality of sets of frames, wherein the composite data stream comprises frames with indicators representing objects detected by each machine learning model at a corresponding location associated with each object.

2. Any of the preceding embodiments, wherein a first type of data is video data, a second type of data is infrared data, a third type of data is thermal data, a fourth type of data is audio data, and a fifth type of data is point cloud data.

3. Any of the preceding embodiments, wherein selecting from the plurality of data streams the plurality of sets of frames comprises: determining a time period common to the plurality of data streams; determining a frequency of each data stream of the plurality of data streams; selecting a composite data stream frequency based on a lowest frequency data stream; selecting a first timestamp within the time period common to the plurality of data streams; locating, within each data stream of the plurality of data streams, a corresponding frame associated with the first timestamp; and generating a first set of frames that match the first timestamp based on frames with the plurality of data streams that match the first timestamp.

4. Any of the preceding embodiments, wherein generating the composite data stream based on the plurality of sets of frames comprises: retrieving, for a first set of frames, a plurality of objects detected by the plurality of machine learning models; selecting a video frame from the first set of frames; determining for the plurality of objects corresponding locations within the video frame; and overlaying an indicator of each corresponding object at the corresponding location within the video frame.

5. Any of the preceding embodiments, wherein each data stream of the plurality of data streams is received from a corresponding unmanned vehicle of a plurality of unmanned vehicles.

6. Any of the proceeding embodiments, further comprising: transmitting a payload request to each unmanned vehicle of the plurality of unmanned vehicles, wherein the payload request queries the corresponding unmanned vehicle for an identifier of recording device onboard; receiving, from the plurality of unmanned vehicles, a plurality of identifiers of recording devices onboard each unmanned vehicle; and generating, for each unmanned vehicle in the plurality of unmanned vehicles based on a corresponding recording device, a movement command for moving a corresponding vehicle into a position for receiving data of the location.

7. Any of the preceding embodiments, wherein generating the composite data stream comprises: determining that a first machine learning model of the plurality of machine learning models detected a first object in a first frame of a first data stream, wherein the first frame is associated with a first timestamp; determining that a second machine learning model of the plurality of machine learning models has detected the first object in a second frame of a second data stream, wherein the second frame is associated with the first timestamp; and adding a first indicator to a first composite frame indicating that the first object has been detected by both the first machine learning model and the second machine learning model.

8. Any of the preceding embodiments, wherein generating the composite data stream based on the plurality of sets of frames comprises: determining that a first machine learning model of the plurality of machine learning models did not detect a first object in a first frame of a first data stream, wherein the first frame is associated with a first timestamp; determining that a second machine learning model of the plurality of machine learning models has detected the first object in a second frame of a second data stream, wherein the second frame is associated with the first timestamp; determining, based on a first location associated with the first object in the second frame, a second location of the first object in the second frame, wherein the first location and the second location have matching geographic coordinates; generating a composite frame from the first frame; and overlaying an image of the first object onto the composite frame at the second location.

9. A tangible, non-transitory, machine-readable medium storing instructions that, when executed by a data processing apparatus, cause the data processing apparatus to perform operations comprising those of any of embodiments 1-8.

10. A system comprising: one or more processors; and memory storing instructions that, when executed by the processors, cause the processors to effectuate operations comprising those of any of embodiments 1-8.

11. A system comprising means for performing any of embodiments 1-8.

12. A system comprising cloud-based circuitry for performing any of embodiments 1-8.

What is claimed is:

1. A system for generating composite images of objects detected in multiple different types of data frames, the system comprising:
one or more processors; and
a non-transitory, computer-readable storage medium storing instructions, which when executed by the one or more processors, cause the one or more processors to perform operations comprising:
receiving a plurality of data streams from a plurality of unmanned vehicles simultaneously recording data of a location using a corresponding recording device, wherein each of the plurality of data streams comprises a corresponding plurality of frames, and wherein the plurality of data streams comprises data streams having captured data of different wavelength ranges;
determining, based on the different wavelength ranges for each data stream of the plurality of data streams received from the plurality of unmanned vehicles, a type of data frames captured within each data stream of the plurality of data streams that are received from the plurality of unmanned vehicles;
determining, for each data stream of the plurality of data streams based on the type of data captured within each data stream, a corresponding machine learning model of a plurality of machine learning models for identifying objects within each data stream, wherein each machine learning model of the plurality of machine learning models has been trained to identify one or more objects within a frame of a particular type of data;
inputting each of the plurality of data streams into the corresponding machine learning model of the plurality of machine learning models;
receiving, from each machine learning model, a plurality of object identifiers and a plurality of object locations corresponding to a plurality of objects detected in each data stream of the plurality of data streams;
selecting, from the plurality of data streams, a plurality of sets of frames, wherein each set of frames of the plurality of sets of frames matches a corresponding timestamp;
determining for each object within a first set of frames a corresponding location, wherein the first set of frames includes frames from each data stream having a given timestamp; and
generating for display a composite frame for the given timestamp and having frames from each data stream each having the given timestamp, wherein the composite frame comprises a base frame selected from the plurality of data streams and indicators indicating a type or description of each object detected by each machine learning model, the indicators overlayed over the base frame.

2. The system of claim 1, wherein a first type of data stream is video data, a second type of data is infrared data, a third type of data is thermal data, a fourth type of data is audio data, and a fifth type of data is point cloud data.

3. The system of claim 1, wherein the instructions for selecting, from the plurality of data streams, the plurality of sets of frames further cause the one or more processors to perform operations comprising:
determining a time period common to the plurality of data streams;
determining a frequency of each data stream of the plurality of data streams;
selecting a composite data stream frequency based on a lowest frequency data stream;
selecting a first timestamp within the time period common to the plurality of data streams;

locating, within each data stream of the plurality of data streams, a corresponding frame associated with the first timestamp; and generating, from frames within the plurality of data streams, a set of frames matching the first timestamp.

4. The system of claim 3, wherein the instructions for generating the composite frame for each timestamp, when executed by the one or more processors, further cause the one or more processors to perform operations comprising:
accessing the first set of frames;
selecting a video frame from the first set of frames;
determining for each object within the first set of frames the corresponding location within the video frame; and
overlaying an indicator of each corresponding object at the corresponding location within the video frame.

5. A method comprising:
receiving a plurality of data streams comprising recording data of a location, wherein the plurality of data streams comprises data of different types from a plurality of vehicles;
determining a type of data frames captured within each data stream of the plurality of data streams that are received from the plurality of vehicles;
determining, for each data stream of the plurality of data streams based on the type of data captured within each data stream, a corresponding machine learning model of a plurality of machine learning models, wherein each machine learning model of the plurality of machine learning models has been trained to identify objects within a frame of a particular type of data;
inputting each of the plurality of data streams into the corresponding machine learning model of the plurality of machine learning models;
receiving, from each machine learning model, a plurality of object identifiers and a plurality of object locations corresponding to one or more objects detected in each data stream of the plurality of data streams;
selecting, from the plurality of data streams, a plurality of sets of frames, wherein each set of frames of the plurality of sets of frames matches a corresponding timestamp of a plurality of timestamps;
determining for each object within a first set of frames a corresponding location, wherein the first set of frames includes frames from each data stream having a given timestamp; and
generating for display a composite data frame for the given timestamp, wherein the composite data frame comprises a base frame selected from the plurality of data streams and indicators indicating an object type or object description of each object detected by each machine learning model, the indicators overlayed over the base frame.

6. The method of claim 5, further comprising:
determining that a first location in three-dimensional space of a first object detected by a first machine learning model of the plurality of machine learning models matches a second location within the three-dimensional space of a second object detected by a second machine learning model of the plurality of machine learning models;
determining that the first object is associated with a first type and the second object is associated with a second type;
determining, based on type data, that a combination the first type and the second type indicates an alert condition; and based on determining that the combination the first type and the second type indicates the alert condition, generating for display within the composite data frame, an alert associated with the first location.

7. The method of claim 5, wherein selecting, from the plurality of data streams, the plurality of sets of frames comprises:
determining a time period common to the plurality of data streams;
determining a frequency of each data stream of the plurality of data streams;
selecting a composite data stream frequency based on a lowest frequency data stream;
selecting a first timestamp within the time period common to the plurality of data streams;
locating, within each data stream of the plurality of data streams, a corresponding frame associated with the first timestamp; and
generating a set of frames that match the first timestamp based on frames with the plurality of data streams that match the first timestamp.

8. The method of claim 5, wherein generating the composite data frame based on the plurality of sets of frames comprises:
retrieving, for the first set of frames, a plurality of objects detected by the plurality of machine learning models;
selecting a video frame from the first set of frames;
determining for the plurality of objects corresponding locations within the video frame; and
overlaying an indicator of each corresponding object at the corresponding location within the video frame.

9. The method of claim 5, wherein each data stream of the plurality of data streams is received from a corresponding unmanned vehicle of a plurality of unmanned vehicles.

10. The method of claim 9, further comprising:
transmitting a payload request to each unmanned vehicle of the plurality of unmanned vehicles, wherein the payload request queries the corresponding unmanned vehicle for an identifier of recording device onboard;
receiving, from the plurality of unmanned vehicles, a plurality of identifiers of recording devices onboard each unmanned vehicle; and
generating, for each unmanned vehicle in the plurality of unmanned vehicles based on a corresponding recording device, a movement command for moving a corresponding vehicle into a position for receiving data of the location.

11. The method of claim 5, wherein generating the composite data frame comprises:
determining that a first machine learning model of the plurality of machine learning models detected a first object in a first frame of a first data stream, wherein the first frame is associated with a first timestamp;
determining that a second machine learning model of the plurality of machine learning models has detected the first object in a second frame of a second data stream, wherein the second frame is associated with the first timestamp; and
generating for display a first indicator to a first composite frame indicating that the first object has been detected by both the first machine learning model and the second machine learning model.

12. The method of claim 5, wherein generating the composite data frame based on the plurality of sets of frames comprises:
determining that a first machine learning model of the plurality of machine learning models did not detect a first object in a first frame of a first data stream, wherein the first frame is associated with a first timestamp;

determining that a second machine learning model of the plurality of machine learning models has detected the first object in a second frame of a second data stream, wherein the second frame is associated with the first timestamp;

determining, based on a first location associated with the first object in the second frame, a second location of the first object in the second frame, wherein the first location and the second location have matching geographic coordinates;

generating for display a composite frame from the first frame; and overlaying an image of the first object onto the composite frame at the second location.

13. A non-transitory, computer-readable medium comprising instructions for generating composite images of objects detected in multiple different types of data frames, that when executed by one or more processors, cause the one or more processors to perform operations comprising:

receiving a plurality of data streams comprising recording data of a location, wherein the plurality of data streams comprises data of different types from a plurality of vehicles;

determining a type of the data frames captured within each data stream of the plurality of data streams that are received from the plurality of vehicles;

determining, for each data stream of the plurality of data streams based on the type of data captured within each data stream, a corresponding machine learning model of a plurality of machine learning models, wherein each machine learning model of the plurality of machine learning models has been trained to identify objects within a frame of a particular type of data;

inputting each of the plurality of data streams into the corresponding machine learning model of the plurality of machine learning models;

receiving, from each machine learning model, a plurality of object identifiers and a plurality of object locations corresponding to one or more objects detected in each data stream of the plurality of data streams;

selecting, from the plurality of data streams, a plurality of sets of frames, wherein each set of frames of the plurality of sets of frames matches a corresponding timestamp of a plurality of timestamps;

determining for each object within a first set of frames a corresponding location, wherein the first set of frames includes frames from each data stream having a given timestamp; and generating for display a composite data frame for the given timestamp, wherein the composite data frame comprises a base frame selected from the plurality of data streams and indicators indicating an object type or object description of each object detected by each machine learning model, the indicators overlayed over the base frame.

14. The non-transitory, computer-readable medium of claim 13, wherein the instructions further cause on the one or more processors to perform operations comprising:

determining that a first location in three-dimensional space of a first object detected by a first machine learning model of the plurality of machine learning models matches a second location within the three-dimensional space of a second object detected by a second machine learning model of the plurality of machine learning models;

determining that the first object is associated with a first type and the second object is associated with a second type;

determining, based on type data, that a combination the first type and the second type indicates an alert condition; and based on determining that the combination the first type and the second type indicates the alert condition, generating for display within the composite data frame, an alert associated with the first location.

15. The non-transitory, computer-readable medium of claim 13, wherein the instructions for selecting from the plurality of data streams further cause the one or more processors to perform operations comprising:

determining a time period common to the plurality of data streams;

determining a frequency of each data stream of the plurality of data streams;

selecting a composite data stream frequency based on a lowest frequency data stream;

selecting a first timestamp within the time period common to the plurality of data streams;

locating, within each data stream of the plurality of data streams, a corresponding frame associated with the first timestamp; and generating a set of frames that match the first timestamp based on frames with the plurality of data streams that match the first timestamp.

16. The non-transitory, computer-readable medium of claim 13, wherein the instructions for generating the composite data frame based on the plurality of sets of frames further cause the one or more processors to perform operations comprising:

retrieving, for the first set of frames, a plurality of objects detected by the plurality of machine learning models;

selecting a video frame from the first set of frames;

determining for the plurality of objects corresponding locations within the video frame; and overlaying an indicator of each corresponding object at the corresponding location within the video frame.

17. The non-transitory, computer-readable medium of claim 13, wherein each data stream of the plurality of data streams is received from a corresponding unmanned vehicle of a plurality of unmanned vehicles.

18. The non-transitory, computer-readable medium of claim 17 wherein the instructions further cause the one or more processors to perform operations comprising:

transmitting a payload request to each unmanned vehicle of the plurality of unmanned vehicles, wherein the payload request queries the corresponding unmanned vehicle for an identifier of recording device onboard;

receiving, from the plurality of unmanned vehicles, a plurality of identifiers of recording devices onboard each unmanned vehicle; and generating, for each unmanned vehicle in the plurality of unmanned vehicles based on a corresponding recording device, a movement command for moving a corresponding vehicle into a position for receiving data of the location.

19. The non-transitory, computer-readable medium of claim 13, wherein the instructions for generating the composite data frame further cause the one or more processors to perform operations comprising:

determining that a first machine learning model of the plurality of machine learning models detected a first object in a first frame of a first data stream, wherein the first frame is associated with a first timestamp;

determining that a second machine learning model of the plurality of machine learning models has detected the first object in a second frame of a second data stream, wherein the second frame is associated with the first timestamp; and generating a first indicator to a first composite frame indicating that the first object has been detected by both the first machine learning model and the second machine learning model.

20. The non-transitory, computer-readable medium of claim 13, wherein the instructions for generating the composite data frame based on the plurality of sets of frames further cause the one or more processors to perform operations comprising:

determining that a first machine learning model of the plurality of machine learning models did not detect a first object in a first frame of a first data stream, wherein the first frame is associated with a first timestamp;

determining that a second machine learning model of the plurality of machine learning models has detected the first object in a second frame of a second data stream, wherein the second frame is associated with the first timestamp;

determining, based on a first location associated with the first object in the second frame, a second location of the first object in the second frame, wherein the first location and the second location have matching geographic coordinates;

generating for display a composite frame from the first frame; and overlaying an image of the first object onto the composite frame at the second location.

\* \* \* \* \*